W. C. DUNLAP.
COMBINED CULTIVATOR AND PLANTER.
APPLICATION FILED JULY 22, 1912.

1,045,381.

Patented Nov. 26, 1912.

UNITED STATES PATENT OFFICE.

WILLIAM C. DUNLAP, OF EUROPA, MISSISSIPPI.

COMBINED CULTIVATOR AND PLANTER.

1,045,381. Specification of Letters Patent. Patented Nov. 26, 1912.

Original application filed April 4, 1911, Serial No. 618,876. Divided and this application filed July 22, 1912. Serial No. 711,000.

*To all whom it may concern:*

Be it known that I, WILLIAM C. DUNLAP, a citizen of the United States, residing at Europa, in the county of Webster and State of Mississippi, have invented certain new and useful Improvements in Combined Cultivators and Planters, of which the following is a specification, reference being had to the accompanying drawings.

This invention relates to combined cultivators and planters and more particularly to a machine of that character shown and described in my prior application filed April 4, 1911, Serial Number 618,876, and which has eventuated into Patent Number 1,025,458, issued May 7, 1912; of which the present application is a division.

The invention forming the subject matter of this application has for its principal object the provision of improved means for detachably connecting the planter to the cultivator frame whereby the cultivator and planter may be easily and quickly assembled in their proper relative positions or separated so that they can be conveniently handled and compactly stored.

A further and more specific object of the invention resides in the provision of a V shaped harrow frame and a planter including a beam centrally disposed and longitudinally extending between the diverging bars of said frame, means for adjustably supporting one end of the beam upon the frame to regulate the depth at which the seed are planted, and oppositely extending arms mounted upon the beam and movable in guides provided upon the ends of the diverging frame bars.

Still another object of the invention is to provide a combined cultivator and planter of the above character which is of great convenience in use, and is comparatively simple in form, thereby conducing to a low cost of manufacture, and resulting in the production of a machine which is very durable and highly efficient in operation.

With the above and other objects in view, the invention consists in the novel features of construction and the combination and arrangement of parts hereinafter more fully described, pointed out in the claims and shown in the accompanying drawings, in which, Figure 1 is a top plan view of a machine embodying the present invention. Fig. 2 is a longitudinal section thereof on line 2—2 of Fig. 1. Fig. 3 is a section taken on the line 3—3 of Fig. 1.

Referring in detail to the drawing, 5 designates the axle upon the ends of which the supporting wheels 6 are revolubly mounted.

7 designates generally a cultivator which is mounted upon the axle 5 as shown in my prior patent hereinbefore referred to or in any other preferred manner and preferably includes a V shaped frame 8. The apex of this frame is located centrally between the supporting wheels 6 and upon one side of the axle 5 while the ends of the diverging bars 9 of the said frame are disposed upon the opposite side of said axle.

10 indicates the longitudinally extending beam of the planter. This beam is centrally disposed between the diverging bars of the frame 8 and has one of its ends disposed adjacent to the point or apex of said V shaped frame. This end of the planter beam is reduced as indicated at 11 and is disposed between the upstanding ends 13 of the transversely disposed plates 12 which are fixed at their other ends to the diverging bars of the frame 8. These vertically disposed ends of the plates 12 are each provided with a series of openings 14 to receive the bolt 15 which is adapted to be inserted through an opening in the reduced end 11 of the beam 10 to pivotally support said beam between the ends of the plates 12.

The rear end of the beam 10 is provided with a longitudinal opening for the accommodation of the ground wheel 16 to support said beam. Upon one end of the shaft of this ground wheel, a belt pulley 17 is secured which is traversed by a driving belt 18 which operates the planting mechanism.

19 indicates the seed box mounted upon the beam 10, and 20 the usual furrow-opening shoe through which the seed are dropped. A scraping plate 21 is mounted upon one end of the beam 10 and a counterweighted lever 22 is secured to said scraper so as to hold the latter against the periphery of the dished wheel 16, so as to remove accumulations therefrom so that the seed will be evenly deposited at the same depth in the movement of the machine.

To the beam 10 intermediate of its ends, the obliquely disposed arms 23 are secured, said arms extending upon opposite sides of the beam and having their free ends bent at right angles as indicated at 24 and loosely disposed in the guide members 25 which are secured to the ends of the diverging bars 8 upon the inner sides thereof. These arms 23 effectually prevent transverse shifting movement of the beam 10 and relieve the plates 12 between which said beam is mounted of undue strain. In the vertical adjustment of the forward end of the beam 10, the angular ends 24 of the arms 23 move freely in the guides 25.

From the foregoing it is thought that the construction and manner of operation of my improved combination cultivator and planter will be clearly understood. It will be apparent that by mounting the planter beam upon the cultivator frame as above described, the same may be easily and quickly arranged in its proper position with relation to the cultivator or disconnected therefrom.

A machine embodying the structural features above specified may be manufactured at small cost, is extremely durable and reliable in practical use and may be stored or housed in a comparatively restricted space.

While I have shown and described the preferred construction of the various elements, it will be understood that the invention is susceptible of considerable modification without departing from the essential features or sacrificing any of the advantages thereof.

What I claim is:—

1. The combination with a cultivator frame, of a planter including a beam, means for adjustably mounting one end of the beam upon said frame, and arms extending from opposite sides of the beam and vertically movable upon said frame.

2. The combination with a cultivator frame, of a planter including a beam, means for adjustably mounting one end of said beam upon the frame, and means carried by the beam and movable upon the frame to prevent transverse shifting movement of the beam.

3. The combination with a cultivator frame, of a planter including a beam, means for pivotally and adjustably mounting one end of said beam upon the frame, oppositely extending arms fixed at one of their ends to the beam, and guide members on the frame in which the other ends of said arms are movably disposed.

4. The combination with a cultivator frame, of a planter including a beam, spaced vertically disposed plates mounted upon the frame, means vertically adjustable in said plates to pivotally support one end of the beam between the same, arms fixed at one of their ends upon the beam and extending upon opposite sides thereof, the other ends of said arms being angularly bent, and guide members secured to the frame in which the latter ends of said arms are movably mounted.

In testimony whereof I hereunto affix my signature in the presence of two witnesses.

WILLIAM C. DUNLAP.

Witnesses:
 THOMAS W. FOORD,
 HARRY A. GOULD.

---

Copies of this patent may be obtained for five cents each, by addressing the "Commissioner of Patents, Washington, D. C."